No. 739,923. PATENTED SEPT. 29, 1903.
C. PETRINI.
CONNECTION FOR LOCOMOTIVE OIL BURNER HEATERS.
APPLICATION FILED MAY 8, 1903.
NO MODEL.
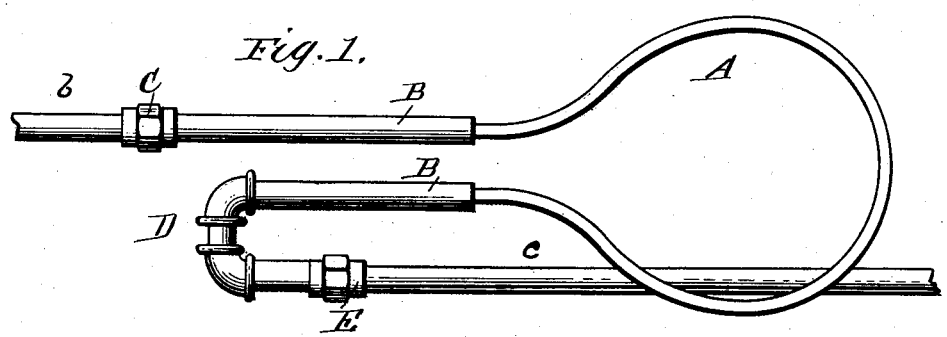
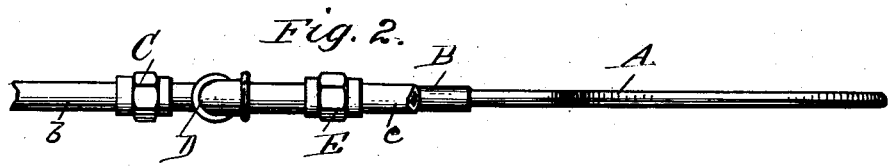
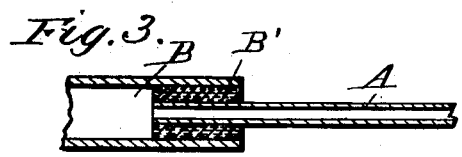
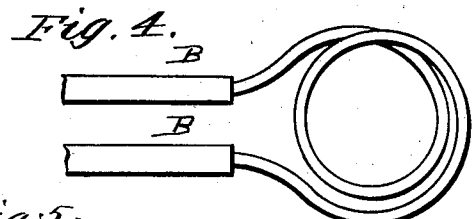
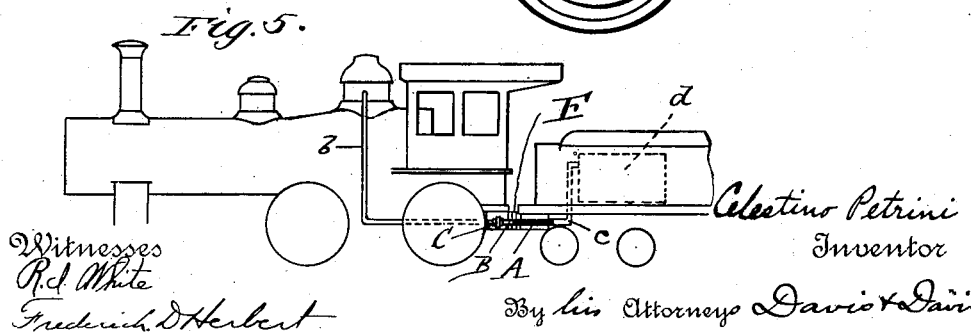

No. 739,923. Patented September 29, 1903.

UNITED STATES PATENT OFFICE.

CELESTINO PETRINI, OF BAKERSFIELD, CALIFORNIA.

CONNECTION FOR LOCOMOTIVE OIL-BURNER HEATERS.

SPECIFICATION forming part of Letters Patent No. 739,923, dated September 29, 1903.

Application filed May 8, 1903. Serial No. 156,239. (No model.)

*To all whom it may concern:*

Be it known that I, CELESTINO PETRINI, a citizen of the United States of America, and a resident of Bakersfield, county of Kern, State of California, have invented certain new and useful Improvements in Connections for Locomotive Oil-Burner Heaters, of which the following is a full, clear, and exact description, reference being had therein to the accompanying drawings, in which—

Figure 1 is a plan view of the attachment; Fig. 2, a side elevation; Fig. 3, a detail section of the connection between the elastic coil and the main pipe; Fig. 4, a plan view of a modified form; and Fig. 5, a diagrammatic view showing the attachment in position.

In all oil-burning locomotives a pipe connection between the locomotive and the oil-tank on the tender is made for the purpose of keeping the oil warm, so that it will flow readily to the burner. Heretofore this connection has been made by suitable couplings and a piece of flexible rubber hose, a flexible connection being required to permit the relative movements between the engine and the tender, as is evident. This hose connection is objectionable because of the fact that the steam soon rots the hose and causes it to burst, and this bursting of the connection causes considerable delays.

It is the object of the invention to obviate the use of this rubber-hose connection and to substitute therefor a metallic pipe connection which will afford the necessary resiliency to permit the locomotive and the tender to vibrate independently, as more fully hereinafter set forth.

Referring to the drawings by letters, B designates two rigid main pipe-sections, which lie side by side and are substantially parallel and whose adjacent ends are connected by a flexible metallic coil A, the ends of the coil being connected to the ends of the pipe in any suitable manner, preferably by clamping them therein with plugs B' of Babbitt metal.

The free end of one of the pipes B is provided with a coupling C to adapt it for detachable connection with the pipe $b$, leading from the steam-space of the locomotive-boiler, and connected to the free end of the other pipe is an elbow D, which is provided with a coupling E for connection with the pipe $c$, leading to the oil-tank $d$, the elbow being provided in order that the coupling E may be faced in the opposite direction of the coupling C and be in position to connect directly to the pipe leading to the oil-tank on the tender.

The coil A is preferably smaller in diameter than either of the pipes B, so that its ends may be passed into the ends of the main pipe-sections, the clamping-plugs securing them centrally therein and so as to afford the resiliency necessary to permit the locomotive and tender to vibrate freely up and down and laterally without breaking the pipe. This elastic loop or coil A forms, in effect, a universal joint, permitting the pipes B and their couplings to move in any direction with respect to each other. Instead of a single loop, as in Fig. 1, a double loop or coil may be employed, as shown in Fig. 4.

The object of permanently and rigidly securing the ends of the elastic loop or coil A within the rigid main pipe-sections B and connecting the coupling means to the ends of the main pipe-sections is to secure a thoroughly-effective steam-tight connection between the pipes. In this construction and arrangement of the parts there is less liability of the connection between the flexible coil and the rigid pipe-sections leaking steam. If the couplings are connected directly to the ends of the small flexible pipe which forms the loop or coil, the constant vibration of the coil would in a short time loosen the coupling means and permit steam to escape.

The pipes B and the connecting elastic coil are arranged in a horizontal plane, so that when the device is applied these parts may be arranged to lie under the decks or floors of the locomotive-cab and the tender, where they will be out of the way and yet be free to vibrate sufficiently to prevent breaking the elastic loop.

In Fig. 5 the location of the connection is indicated, and the locomotive is shown as coupled to the tank-car by the usual flexible coupling, (indicated at F.)

It will be observed that an important feature of this invention lies in employing the elbow D and connecting it to one of the pipes B, so that the coupling E will face in the opposite direction to the other coupling C. In this way the coil A may be arranged horizontally below the floor-line of the tender and cab and may be made as long and as wide as may be found necessary to provide for the usual vibration. By this arrangement it is possible to get all the necessary elasticity from but a single coil, which may be arranged under the floor of either the tender or the cab of the locomotive in such a way as not to interfere with the draft-rigging and the air-pipes.

Having thus fully described my invention, what I claim, and desire to secure by Letters Patent, is—

1. In a device of the character set forth the combination, of two parallel rigid main pipe-sections, an elastic metallic pipe bent to form a loop the ends of said loop entering the ends of the rigid main pipe-sections, the pipe forming said loop being smaller in diameter than the rigid pipe-sections, a metallic packing in the ends of the main pipe-sections to rigidly and permanently clamp the ends of the elastic loop therein, and coupling means connected to the other ends of the main pipe-sections whereby they may be connected to the main train-pipes.

2. The combination of a locomotive, a car flexibly coupled thereto, a steam-pipe in communication with the steam-space of the locomotive, a steam-pipe on the car, means for coupling the said pipes between the locomotive and the car, said means consisting of two parallel rigid main pipe-sections, a coupling on the free end of one of said sections to connect said section to the steam-pipe on the locomotive, an elbow and coupling on the corresponding end of the other section and adapted to connect it to the steam-pipe on the car, a flexible metallic pipe in the form of an elastic loop having its end portions extending in the same direction and substantially parallel said pipe being smaller in diameter than the main pipe-sections and having its ends fitting within the ends of the said main pipe-sections, and a metallic packing rigidly and permanently securing the ends of the elastic loop within the main pipe-sections.

3. In a device of the character set forth the combination, of two rigid main pipe-sections, a flexible metallic pipe in the form of a loop or coil connecting the ends of said main pipe-sections said flexible pipe being smaller in diameter than the rigid pipe-section and having its ends fitting therein, a metallic packing rigidly and permanently securing the ends of the flexible coil within the main pipe-sections, and an independent coupling means connected to the end of each of the rigid pipe-sections.

4. The combination of a locomotive and a tender, the latter carrying an oil-tank, steam-pipes $b$ and $c$ connected respectively to the steam-space of the locomotive and the oil-tank, a pair of substantially parallel pipe-sections B connected at their adjacent ends by a horizontal elastic coil of pipe, a coupling C connecting the opposite end of one of the pipes to the pipe $b$, an elbow connected to the opposite end of the other pipe B and carrying a coupling E, which faces in the opposite direction to said coupling C and is detachably connected to the free end of pipe $c$, for the purposes set forth.

In testimony whereof I hereunto affix my signature, in the presence of two witnesses, this 22d day of April, 1903.

CELESTINO PETRINI.

Witnesses:
GEO. W. PRICE,
S. WRIGHT JEWETT.